United States Patent [19]

Morsbach et al.

[11] Patent Number: 4,629,198
[45] Date of Patent: Dec. 16, 1986

[54] OIL SCRAPER PISTON RING ASSEMBLY

[75] Inventors: Martin Morsbach, Burscheid; Bert Brauers, Blecher-Odenthal, both of Fed. Rep. of Germany

[73] Assignee: Goetze AG, Burscheid, Fed. Rep. of Germany

[21] Appl. No.: 666,227

[22] Filed: Oct. 29, 1984

[30] Foreign Application Priority Data

Nov. 3, 1983 [DE] Fed. Rep. of Germany ....... 3339708

[51] Int. Cl.$^4$ .............. F16J 9/06; F16J 9/20
[52] U.S. Cl. .................... 277/139; 277/143; 267/1.5
[58] Field of Search ............... 277/139–145, 277/216; 267/1.5

[56] References Cited

U.S. PATENT DOCUMENTS

| 2,785,028 | 3/1957 | Olson | 277/140 |
| 2,785,030 | 3/1957 | Olson | 277/140 |
| 2,855,254 | 10/1958 | Beck et al. | 277/143 |
| 2,859,079 | 11/1958 | Olson | 277/143 X |
| 3,195,908 | 1/1964 | Hutto | 277/206 R |
| 3,615,098 | 10/1971 | Sugahara | 277/143 |
| 4,053,164 | 10/1977 | Saylor | 267/1.5 X |
| 4,090,720 | 5/1978 | Morsbach et al. | 267/1.5 X |
| 4,462,602 | 7/1984 | Brauers et al. | 277/139 |

FOREIGN PATENT DOCUMENTS

| 1232419 | 1/1967 | Fed. Rep. of Germany | 277/139 |
| 2023850 | 11/1970 | Fed. Rep. of Germany | |

Primary Examiner—Robert S. Ward
Attorney, Agent, or Firm—Spencer & Frank

[57] ABSTRACT

An oil scraper piston ring assembly includes an oil scraper ring received in a piston groove and being in circular contact with a first side wall of the groove; and a spring ring received in the groove between the oil scraper ring and a second side wall of the groove. The spring ring has circumferentially distributed resilient tongues oriented alternatingly radially inwardly and radially outwardly. The spring ring has a radially outer circular part situated axially adjacent the oil scraper ring and a radially inner circular part bent with respect to the radially outer circular part and extending at least partially radially adjacent an inner periphery of the oil scraper ring. The oil scraper ring is a steel band ring of relatively small axial height, the spring ring is a resilient band ring also of relatively small axial height, and the oil scraper ring and the spring ring have approximately identical thicknesses of material.

12 Claims, 7 Drawing Figures

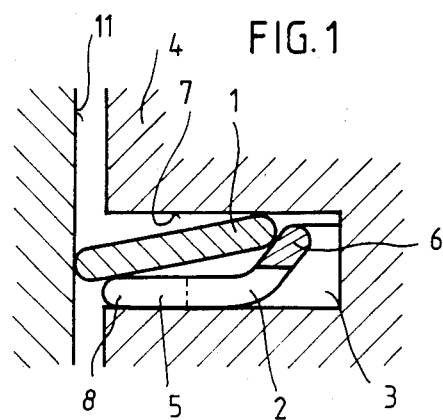
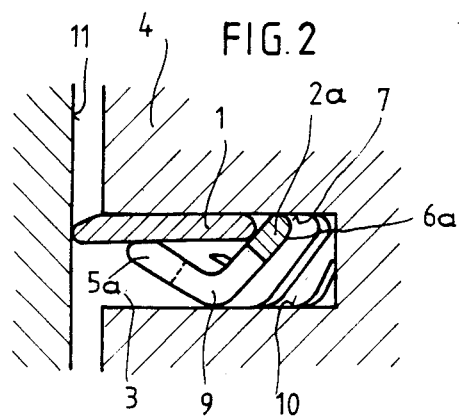
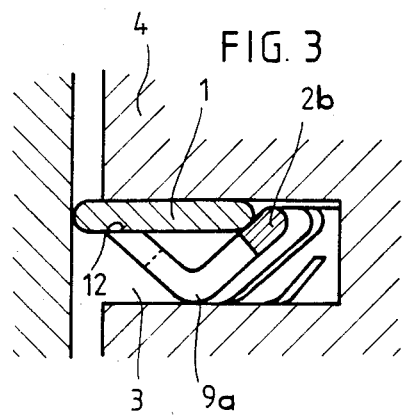
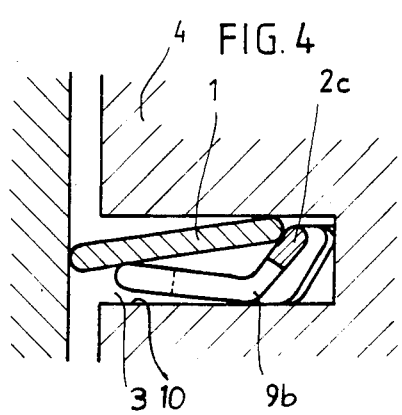
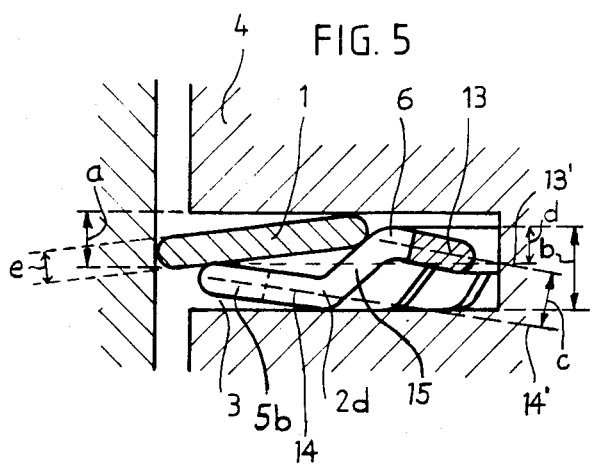
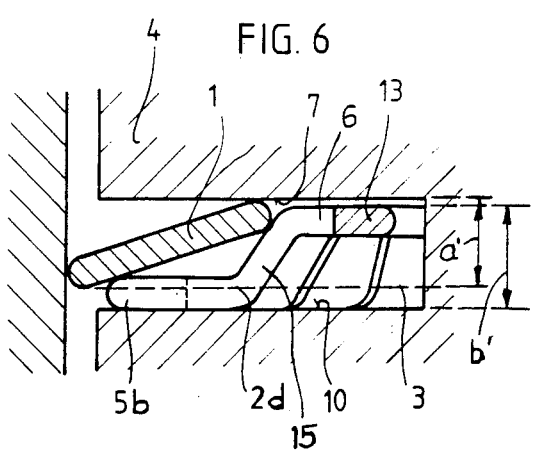

OIL SCRAPER PISTON RING ASSEMBLY

BACKGROUND OF THE INVENTION

The invention relates to oil scraper piston ring assemblies mounted in grooves of pistons forming part of internal combustion engines. The oil scraper piston ring assembly comprises an oil scraper ring engaging that side wall of a piston groove which is closer to the combutsion chamber than the other side wall of the groove and a spring ring which extends essentially axially adjacent the oil scraper ring on that side of the latter which is oriented away from the combustion chamber. The spring ring is provided with alternating radial cuts to form resilient tongues and has a radially inner circular part situated radially inwardly of the oil scraper ring. The radially inner circular part is arranged obliquely with respect to a radially outer circular part of the spring ring, situated axially adjacent the oil scraper ring.

German Offenlegungsschrift (application published without examination) No. 2,023,850 discloses a two-part oil scraper piston ring assembly comprising an oil scraper ring and a spring. The oil scraper ring is formed of a cross-sectionally rectangular metal body which has a substantial dimension in the axial direction. The spring is formed of an angularly bent steel strip provided with alternating cuts. By means of axial force components of the spring, the oil scraper ring is pressed against one of the groove side walls while, at the same time, the spring is in engagement with the oppositely lying groove side wall.

German Pat. No. 1,232,419 discloses a multi-part piston ring assembly for insertion into a piston groove. The spring ring disclosed therein has, along its radially outer circumference, tongues bent in a direction away from the combustion chamber. The tongues are in contact with the outer circumference of a lower piston ring oriented towards the groove bottom. The spring ring is twisted in its unstressed state. At bent portions along the inner circumference of the spring ring there is provided a further piston ring which slidingly cooperates with the wall of the cylinder in which the piston reciprocates.

It has been a long-standing desideratum of the automotive industry to reduce mechanical power dissipation (losses), for example, by means of reducing the axial length of the piston. The axial dimension of the piston ring land may be conceivably reduced by reducing the total axial height of the oil scraper ring. Such a reduction of the axial dimensions, while preserving superior sealing properties may, however, not be realized either by means of three-part (relatively small-height) assemblies or by means of two-part assemblies having components of relatively large axial dimensions.

SUMMARY OF THE INVENTION

It is an object of the invention to provide an improved oil scraper piston ring assembly which has extremely small axial dimensions and which, at the same time, has very satisfactory sealing properties and the spring ring of the assembly has soft spring characteristics.

This object and other to become apparent as the specification progresses, are accomplished by the invention by the following combination of features known by themselves:

a. The oil scraper ring is formed of a steel ribbon having a relatively small axial dimension:

b. The spring ring is formed of a spring strip material also having a relatively small axial dimension; and c. The thickness of the material of the scraper ring and the spring ring are at least approximately identical.

By virtue of the purposeful combination of known features there is provided a two-part oil scraper piston ring assembly which permits a reduction of the piston height and thus leads to the desired reduction of the mechanical power dissipation (losses). Conventional piston ring assemblies having axial heights of 3-4 mm are, in a two-part construction, only conditionally operationally effective since, tensioned to a nominal diameter, they are twisted in the piston groove and thus are jammed (immobilized) therein. The oil scraper piston ring assembly according to the invention, on the other hand, may have axial heights of, for example, 1.2 mm. With such an assembly the smallest possible axial height for spring supported oil scraper rings may be achieved.

In the installed state the oil scraper piston ring assembly seeks to assume a twisted state. By virtue of the non-uniform leverages at the individual points where the forces attack, there is achieved an asymmetrical force introduction into the entire assembly, whereby an axial clamping of the assembly in the groove is avoided.

According to a further feature of the invention, the axial height of the bent spring ring zone corresponds approximately to the axial height (material thickness) of the oil scraper ring.

By virtue of the alternating cuts on the spring ring, tongues are formed which extend underneath the oil scraper ring and which are thus situated on that side of the oil scraper ring which faces away from the combustion chamber associated with the piston. In order to apply a purposefully axially directed force component to the oil scraper ring, according to a further feature of the invention, the tongues, viewed in the circumferential direction, are at least in part so designed that they extend in the direction of the oil scraper ring and form an acute angle with a radial plane thereof. Dependent upon requirements it may be advantageous to bend the tongues at different angles to thus vary the axial force component at the circumference. The acute angle which is thus formed between the tongues and the associated side wall of the piston groove is, according to a further feature of the invention, between 5° and 20°.

According to a further feature of the invention, the bent zone of the spring ring extends, at least in part, at an inclination towards the direction of the oppositely located groove side wall and is oriented away from the oil scraper ring. By this inclined arrangement, the oil scraper piston ring assembly will twist to a greater extent. During operation, the piston ring assembly is capable of twisting only to such an extent until the part of the spring ring situated underneath the oil scraper ring, that is, the tongues of the spring ring, arrive into engagement with the associated groove side wall.

As noted earlier, the piston ring assembly is in a twisted state when installed in the piston groove. This means that an essentially linear contact occurs between the spring ring and the associated groove side wall, as viewed in the circumferential direction. In such an arrangement, however, the spring ring may conceivably anchor itself into the side wall of the groove. In order to prevent such an occurrence, according to a further feature of the invention, the transition of the tongues is rounded in the bent zone of the spring ring. By virtue of this measure, the otherwise advantageous linear contact between the spring ring and the groove side wall is substantially preserved. The radius of curvature of such a rounding is in a range of 0.4 to 1.0 mm.

According to a further feature of the invention, the substantially axially bent zone of the spring ring is, at least in part, extended in the radial direction, oriented away from the oil scraper ring. This arrangement has the advantage that in addition to reducing the total axial structural dimension, a soft spring characteristic is obtained which serves to ensure a possibly small tangential force reduction over the service life of the spring ring. To further amplify this effect, according to another feature of the invention, the bending (springing) zone of the spring ring is situated substantially radially inwardly of the oil scraper ring.

According to still another feature of the invention, the above-noted radial extension is so designed that it extends parallel to that zone of the spring ring which is situated underneath the oil scraper ring. By virtue of this arrangement, there is obtained a spring ring with an asymmetrical, approximately S-shaped cross section. Preferably, the ratio of the length to the height of the radial extension is approximately 2:1.

BRIEF DESCRIPTION OF THE DRAWINGS

FIGS. 1 through 4 are axial sectional views of four preferred embodiments of the invention.

FIGS. 5 and 6 are axial sectional views of a fifth preferred embodiment, illustrated upon installation and during operation, respectively.

DESCRIPTION OF THE PREFERRED EMBODIMENTS

Figure 7:
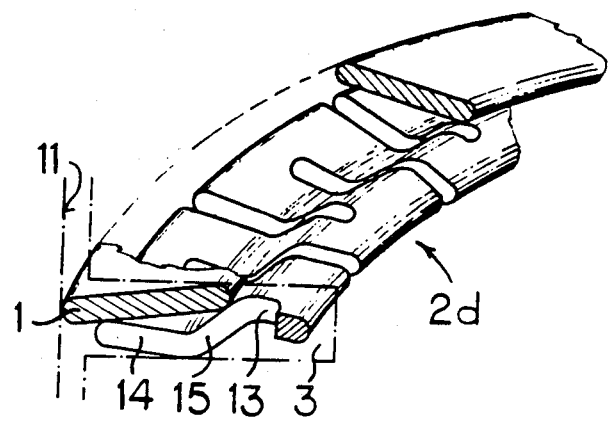
FIG. 7 is a fragmentary perspective view of the construction illustrated in FIG. 5.

The oil scraper piston ring assemblies shown in FIGS. 1 through 6 each comprise an oil scraper ring 1 made of a steel ribbon material as well as a spring ring 2 (FIG. 1), 2a (FIG. 2), 2b (FIG. 3), 2c (FIG. 4) and 2d (FIGS. 5, 6 and 7) made of a spring strip material. Both elements 1 and 2–2d have an approximately equal material thickness of about 0.5 mm. The piston ring assembly is installed in a circumferential groove 3 of a piston 4. The spring ring 2–2d has cuts extending alternatingly, whereby resilient tongues 5 (FIG. 1), 5a (FIG. 2) and 5b (FIGS. 5, 6) and 6 (FIGS. 1, 5, 6) and 6a (FIG. 2) are formed. The tongues 5, 5a, 5b are situated substantially underneath the oil scraper ring 1 (as viewed in the Figures) whereas the tongues 6, 6a are bent essentially in an axial direction towards the oppositely lying groove side wall 7. The axial height of the whole oil scraper piston ring (spring ring 2 and oil scraper ring 1) is about 1.2 mm, wherein the thickness of the steel ribbon material will be about 0.4 to 0.6 mm and the thickness of the spring strip material will be about 0.4 to 0.7 mm.

Turning now to FIG. 1, the spring ring 2 has, as viewed in section, to approximately L-shaped configuration wherein the bent zone forming tongues 6 extends at an inclination. The inner periphery of the oil scraper ring 1 is supported radially by the tongues 6 and is twisted by virtue of its inclination in such a manner that it engages, with a linear contact, the groove side wall 7 as well as a radially outer end zone 8 of the spring ring 2.

FIG. 2 show a spring ring 2a of approximately boomerang-shaped cross section. The tongues 5a are bent in the direction of the oil scraper ring 1 and urge the latter with its entire radial face flat against the groove side wall 7. The spring ring 2a is rounded in the zone 9 where it contacts the groove side wall 10. The tongues 6a press the oil scraper ring 1 radially against the cylinder wall 11.

FIG. 3 is analogous to the embodiment shown in FIG. 2 with the exception that the contact regions 9a and 12 of the spring ring 2b are flattened.

In FIG. 4 there is shown an approximately L-shaped spring ring 2c wherein the tongues 5b are at an angle of approximately 10° with respect to the groove side wall 10. The radius of curvature of the contact zone 9b of the spring ring 2c is approximately 1 mm.

FIGS. 5 and 6 show an oil scraper piston ring assembly wherein the spring ring 2d has an approximately S-shaped cross-sectional configuration. This embodiment is a modification of that illustrated in FIG. 4. The radial extension 13 adjoining the tongues 6 serves to soften the spring characteristic of the spring ring 2d in order to maintain at a low value a tangential force reduction during the service life of the spring ring. FIG. 5 illustrates the position of the piston ring assembly upon installation, whereas FIG. 6 shows the position of the same components during operation. It is thus seen that during operation, the entire assembly pivots, because of the asymmetrical force application, in such a maner that the tongues 5b of the spring ring 2d engage with their entire underface the groove flank 10. The tongues 5b as well as the extension 13 are approximately parallel in order to prevent a contacting of the groove flank 7 during tilting. The length/height (thickness) ratio of the extension 13 is approximately 2:1, while the extension 13 should be radially shorter than the tongues 5b which, at their outer end, are in engagement with the oil scraper ring 1.

With particular reference to FIGS. 5 and 7, the spring ring 2d is, for example, as a result of an appropriate bending operation, composed of three annular parts: the radially inner annular ring part 13, a radially outer annular ring part 14 and an annular ring part 15 which connects the ring parts 13 and 14. The radially inner annular part 13 extends radially inwardly adjacent the oil scraper ring 1, while the radially outer annular ring part 14 is situated axially adjacent the oil scraper ring 1 and contacts the groove wall 10. The connecting ring part 15 integrally joins the radially outer peripheral zone of the ring part 13 and the radially inner peripheral zone of the outer ring part 14. The radially outer edge zone of the oil scraper ring is in contact with the cylinder wall 11 while the radially inner peripheral zone of the oil scraper ring 1 is in engagement with the annular connecting part 15. The planes 13' and 14' in which the respective radially inner annular parts 13 and 14 lie extend generally parallel to one another and are spaced in the axial direction, as indicated at c. Further, the total axial height a of the oil scraper ring 1 is slightly less than the total axial height b of the spring ring 2d (as shown in FIG. 5). The same relationship is present in the FIG. 6 arrangement as indicated at a' and b'.

Also, the extent of axial offset d between the inner ring part 13 and the outer ring part 14 is slightly greater than the thickness e of the oil scraper ring 1.

It will be understood that the above description of the present invention is susceptible to various modifications, changes and adaptations, and the same are intended to be comprehended within the meaning and range of equivalents of the appended claims.

What is claimed is:

1. In an oil scraper piston ring and piston assembly, said piston including a circumferential groove having opposite first and second side walls; an oil scraper ring received in said groove and being in circular contact with said first side wall; a spring ring received in said groove between said oil scraper ring and said second side wall; said spring ring having circumferentially distributed resilient tongues oriented alternatingly radially inwardly and radially outwardly; said spring ring having a first, radially inner annular part extending radially adjacent said oil scraper ring and contacting said second side wall; the improvement wherein said first part lying in a first plane and said second part lying in a second plane; said first and second planes being axially spaced from and are generally parallel to one another; said first part having a radially outer circumferential zone and said second part having a radially inner circumferential zone; further wherein said spring ring comprises a third annular part integrally interconnecting said radially outer circumferential zone of said first part with said radially inner circumferential zone of said second part; said third part being oriented at an oblique angle relative to said first and second planes and being engaged by a radially inner periphery of said oil scraper ring.

2. An oil scraper piston ring and piston assembly as defined in claim 1, wherein the axial height of said second and third annular parts together is approximately identical to the axial height of said oil scraper ring.

3. An oil scraper piston ring and piston assembly as defined in claim 1, wherein said oil scraper ring and said spring ring have together a total axial height of about 1.2 mm.

4. An oil scraper piston ring and piston assembly as defined in claim 1, wherein the thickness of material of said oil scraper ring is approximately 0.5 mm.

5. An oil scraper piston ring and piston assembly as defined in claim 1, wherein said third annular part extends at least partially obliquely toward and with respect to said first side wall.

6. An oil scraper piston ring and piston assembly as defined in claim 1, wherein said first annular part radially measured length and an axially measured height; said length is approximately twice said height.

7. An oil scraper piston ring and piston assembly as defined in claim 1, wherein said second annular part extends toward said oil scraper ring at an acute angle relative to a radial plane of said oil scraper ring.

8. An oil scraper piston ring and piston assembly as defined in claim 7, wherein said second annular part is inclined to said second side wall at an angle of between 5° and 20°.

9. An oil scraper piston ring and piston assembly as defined in claim 7, wherein a transitional portion between said first annular part and said third annular part of said spring ring has a rounding.

10. An oil scraper piston ring and piston assembly as defined in claim 9, wherein said rounding has a radius of curvature of between 0.4 mm to 1.0 mm.

11. An oil scraper piston ring and piston assembly as defined in claim 1, wherein said oil scraper ring and said spring ring have respective axial heights; and further wherein the axial height of said spring ring is slightly greater than the axial height of said oil scraper ring.

12. An oil scraper piston ring and piston assembly as defined in claim 1, wherein said oil scraper ring has a thickness and further wherein said first and second annular parts are axially offset relative to one another to an extent slightly greater than said thickness.

* * * * *